United States Patent [19]

Ginsberg et al.

[11] Patent Number: 5,011,649
[45] Date of Patent: Apr. 30, 1991

[54] CALIBRATION OF ROD POSITION INDICATORS

[76] Inventors: Arthur P. Ginsberg, 249-22 57th Ave., Little Neck, N.Y. 11362; James P. Mooney, Crosby Ave., Brewster, N.Y. 10509

[21] Appl. No.: 451,100

[22] Filed: Dec. 15, 1989

[51] Int. Cl.⁵ .............................................. G21C 7/36
[52] U.S. Cl. .................................. 376/215; 376/240; 376/258
[58] Field of Search ............... 376/215, 219, 224, 228, 376/240, 258

[56] References Cited

U.S. PATENT DOCUMENTS

| | | | |
|---|---|---|---|
| 3,656,074 | 4/1972 | Bevilacqua | 335/206 |
| 3,846,771 | 11/1974 | Young | 340/195 |
| 3,858,191 | 12/1974 | Neuner | 340/188 R |
| 3,893,090 | 7/1975 | Neuner | 340/188 R |
| 3,906,469 | 9/1975 | Kronk | 340/188 R |
| 4,008,455 | 2/1977 | Pedersen | 340/1 R |
| 4,014,741 | 3/1977 | Foxworthy | 376/215 |
| 4,053,355 | 10/1977 | Vuckovich | 376/215 |
| 4,604,576 | 8/1986 | Barrault | 376/258 |

Primary Examiner—Donald P. Walsh
Attorney, Agent, or Firm—Brooks Haidt Haffner & Delahunty

[57] ABSTRACT

The rod position indicator system of a pressurized nuclear reactor can be calibrated for one or more control rods without shutdown of the reactor. The procedure involves lowering reactor power to a level at which the control rod which appears to be misaligned can be fully inserted and its rod position indicator calibrated.

7 Claims, 3 Drawing Sheets

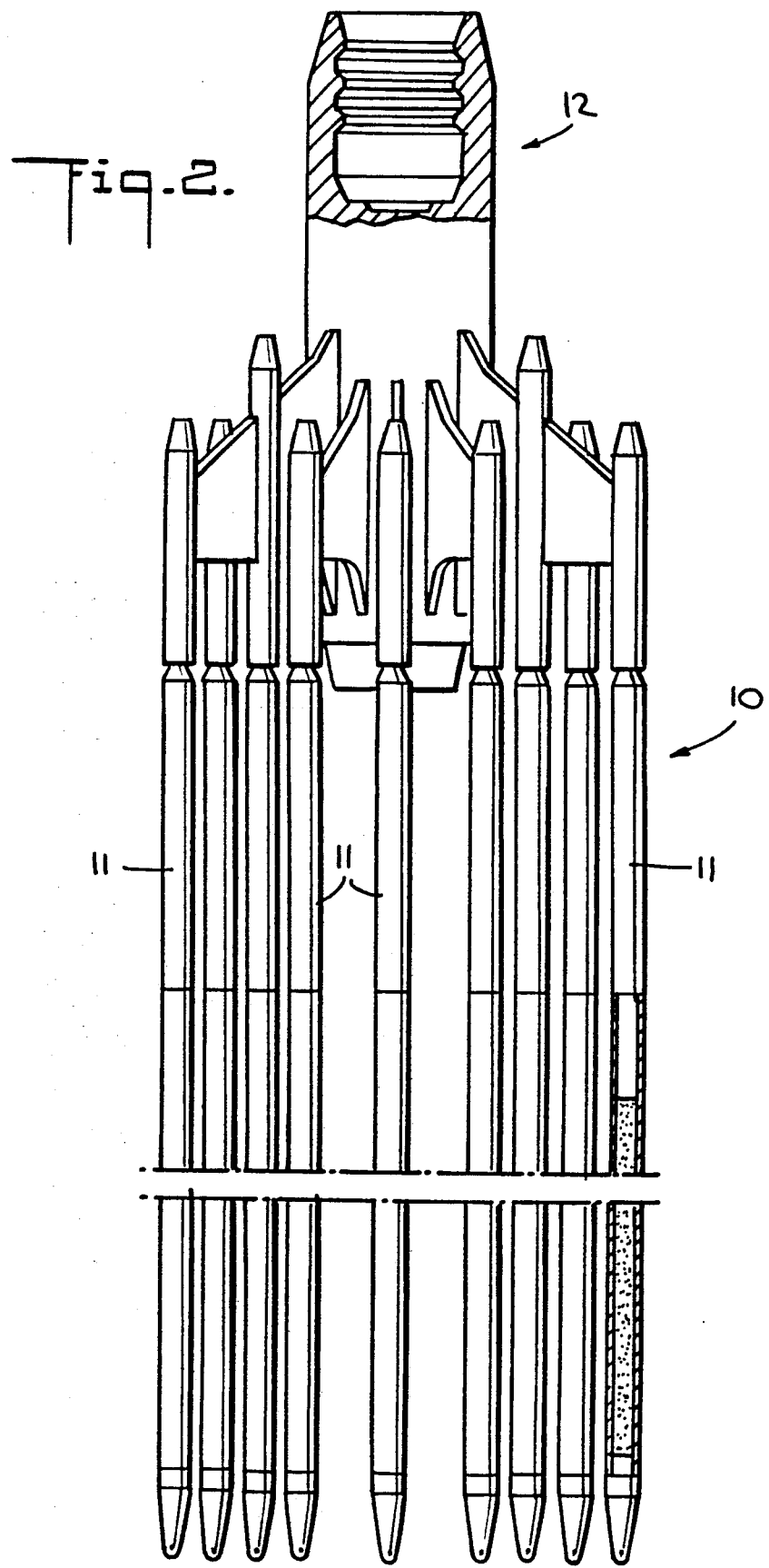

CALIBRATION OF ROD POSITION INDICATORS

BACKGROUND OF THE INVENTION

1. Field of the Invention

The invention relates to the calibration of indicators which show the position of control rods in nuclear reactors. More particularly, it concerns a method of rod position indicator calibration which does not require shutting down of a reactor.

2. Description of the Prior Art

The core of a commercial pressurized nuclear reactor contains a fuel such as uranium 235. This core, which is within a pressure vessel, is cooled by the flow of a reactor coolant, such as water, which removes the heat generated by the nuclear reaction. The coolant flows into the pressure vessel, through the reactor core, out of the pressure vessel, through steam generators and then back into the pressure vessel. A secondary coolant medium, usually also water, is provided in heat transfer relationship within the steam generator with the reactor coolant. This secondary coolant is converted into steam in the steam generator and is thereafter used to produce electricity in a conventional steam turbine electrical generator system.

In such nuclear reactors, control rods are employed for controlling the power output and the power distribution within the core, as well as to shut down the nuclear reaction. Each control rod is actually comprised of a plurality of individual rods, a "rod cluster", which cluster is attached to a drive shaft for vertical movement with respect to the core. A drive mechanism moves the control rods into and out of the core.

The rate of heat generation in the reactor core is proportional to the rate of nuclear fission, which is determined by the neutron flux in the core. The control rods may consist of an alloy of silver-indium-cadmium that is a good absorber of neutrons.

Reactors of this type also employ a soluble absorber, which is incorporated in the coolant water. Boric acid is an effective soluble absorber of thermal neutrons. The boric acid can by itself, in sufficient concentration, keep the reactor shut down even if all of the control rods are fully withdrawn. The soluble boron controls all long term reactivity changes, whether caused by fuel depletion or other processes.

In a typical reactor, the control rods are arranged in several banks, that is, groups of rod clusters that ordinarily are moved simultaneously. Each control rod of each bank is intended to be lowered into the core to the same extent as all of the other rods in the same bank. When a rod is displaced from other rods of its bank in the vertical, axial, sense, the rod is said to be misaligned.

The control rods (i.e. the rod clusters) are mounted on drive shafts which have equally spaced notches or grooves for engagement by two axially spaced sets of latches. Thus the position of a rod can be determined by counting the number of grooves or steps by which a rod is lifted from its fully inserted position. The position of rods can also be checked by performing a flux mapping of the reactor core. When a rod appears to be misaligned, the operator must take action, either to correct the rod position, or to determine that the position is correct and then to calibrate the rod position indicator so that the rod position is shown accurately.

Besides the step counters to indicate the position of control rods, there is also a rod position indication (RPI) system for monitoring the position of each rod. The system includes a rod position detector for each rod, which produces an electrical voltage signal that is inversely proportional to the extent of insertion of the rod into the reactor core. Thus the voltage is zero when the rod is fully inserted, and has its maximum value when the rod is fully withdrawn. This signal is processed and transmitted to a control panel so that an operator can determine whether the rods are properly positioned.

After the rod position indication system has been initially calibrated, with the reactor in a shut down condition, the voltage signal is accurate to within ±5% of the full length of rod travel.

Each rod position detector is a variable transformer consisting of primary and secondary transformer coils "stacked" vertically around the rod drive shaft, which serves as a "core" of the transformer. With a controlled current signal applied to the primary transformer coil windings, the vertical position of the control rod drive shaft determines the extent of electromagnetic coupling with the secondary transformer coils, and thus produces a secondary voltage which is directly proportional to the extent to which the shaft is inserted through the coils, i.e. directly proportional to the extent to which the rod is withdrawn from the reactor core.

When it is indicated that a control rod position is further from the demand position where it is meant to be than allowed by the ±5% error band, it is possible that the rod is misaligned. Another possibility is that the RPI system is not properly calibrated. In the past, when a rod or rods were indicated to be outside the ±5% band, the procedure has been to fully insert all of the control rods, shutting down the nuclear reaction, and then lift the rods, step by step, calibrating the voltage shown by the rod position indicators against the number of steps counted.

Obviously shutting down a power generating reactor is an extreme measure; time is required to restart the reactor after shutdown, and the whole procedure is very costly. The present invention provides a method for calibration of the rod position indication system while the reactor continues to operate at a somewhat reduced level. At such a reduced power level, the generator still remains on the line, continuing to produce electricity, whereas when the reactor is shut down, the generator is off line, and restart is more complicated. The method still allows for the safeguard of resort to conventional shutting down of the nuclear reaction.

More specifically, and by way of example, in a conventional pressurized light water reactor of the type produced by Westinghouse Electric Corporation, there are 53 control rods, each comprising a cluster of 20 individual absorber rods. For simplicity, each cluster of 20 absorber rods, which move together, is referred to simply as a control rod. Some of the control rods are shutdown rods used primarily to shut down the reactor, as in the case of an accident. The remainder of the control rods are used for both shutdown and control. They are combined into four rod banks which operate sequentially, when one bank has been partially withdrawn, the next bank starts to withdraw, and so on until all the rod banks are withdrawn. The same overlapping sequence is followed during rod insertion, except during emergency shutdowns, when these rods fall rapidly into the reactor core, as do the shutdown rods. There is a rod bottom position detection system for each rod which signals that the rod is fully inserted.

Rod positions are detected by the transformer coils mounted around the rod drive shafts which produce voltage signals presented to the operator for visual monitoring. Thus rod position is shown as a voltage signal proportional to rod position, on a voltmeter. A reading of 3.45 volts corresponds to a rod withdrawn a full 230 steps (144 inches), each step corresponding to the uniform ⅝ inch spacing between the grooves or notches of the rod drive shafts, and a reading of 0.00 volts indicates a fully inserted rod, i.e a rod on the bottom. Rod position is also shown as counted in terms of steps. There is also a separate bottom indicator for each control rod, which shows that the rod is essentially at the bottom of its travel.

The actual indicated rod position versus the demand position for the rod is logged at least once per shift by the operator. If two rods in a given bank deviate from each other by a preset amount or if any rod deviates from its demanded position by a preset amount, corrective action is required. The overall accuracy of the rod position indication system is about ±5% of full rod travel, or ±7.2 inches or 12 steps. Thus a rod is considered to be misaligned if it is not within 12 steps of its demanded position. (When a rod is almost fully withdrawn, say more than 210 steps withdrawn, a deviation of 17 steps in the positive sense from demand position is considered tolerable.)

When a rod is indicated to be misaligned, though in fact it is not, the rod position indication (RPI) system requires calibration. In the past calibration has required the plant to be shut down.

SUMMARY OF THE INVENTION

Requiring the shut down of a nuclear reactor in order to caliberate a rod position indicator (RPI) system is a drastic measure, and is extremely costly. Shut down for RPI calibration does not pose any danger from a nuclear standpoint, since the safety of the reactor is ensured, but such a shut down may be dangerous in another sense, when it occurs for example at a time when a power producing utility is subject to peak power demands requiring operation at full capacity: a power blackout could result. It would be desirable to be able to calibrate an RPI system without reactor shut down, at least under certain conditions when safety is ensured. It has now been discovered that calibration can be accomplished without total plant shutdown. Practice of the present invention requires no modification of existing nuclear power plant equipment.

It must first be understood that since nuclear flux is higher in the middle of the reactor core than at either the top or bottom of the core, the importance of exact positioning of control rods near their extreme conditions of withdrawal and insertion, is not so great as when the rods are in an intermediate position. During normal operation the control rods are parked in a fully withdrawn position. The width of the permissible "error band", which represents the difference between demanded rod position and indicated rod position, should therefore be smallest (say ±5% or ±12 steps) near the mid-point position of rod travel, and greater near the extremes of full rod insertion and withdrawal. Perceived rod misalignment can reasonably be allowed to exceed the ±5% band near the top and bottom of the reactor core. It is in such conditions where greater latitude is tolerable that the method of the present invention is likely to be employed, since the control rods are usually at or near their totally withdrawn condition during normal reactor operation. In the past this possibility of expanding the error bands when the rods are near the fully withdrawn or fully inserted positions has not been recognized. The operation of reactors with error bands of constant width has, in the past, required needless reactor shutdowns. Such "false alarms" can be avoided in accordance with the present invention, because of the recognition that precise rod position is less important when the rods are parked at or near their fully withdrawn position.

When a control rod or rods appear to be misaligned, the first procedure is to determine, by indirect checks, whether the rod is actually misaligned. If the rod is in fact misaligned, the rod must be realigned, following established procedures.

However, when it is determined by such indirect checking procedures as the use of movable detectors within the reactor core and detectors located outside the reactor core that the rod is not in fact misaligned, then the RPI is out of calibration. It is possible to calibrate the RPI without complete reactor shutdown by the procedure of the present invention.

While the indirect checks of rod position are being carried out, the effect of inserting the apparently misaligned rod all the way to the bottom can be determined by calculations for given reactor power levels, and a suitable power level at which insertion of the rod will not result in violation of any operating procedures or safety considerations can be established.

The reactor power is then reduced to the appropriate level, say 50% power, and the control rod or rods which appeared to be misaligned are fully inserted, and their RPI calibrated in the usual manner by moving the rod or rods up step by step, and matching the steps with the voltage reading of the RPI.

The method of the invention will be more fully understood when the following detailed description is read in conjunction with the accompanying drawing figures.

BRIEF DESCRIPTION OF THE DRAWINGS

FIG. 2 shows a typical control rod.

DETAILED DESCRIPTION OF PREFERRED EMBODIMENT

Figure 3:
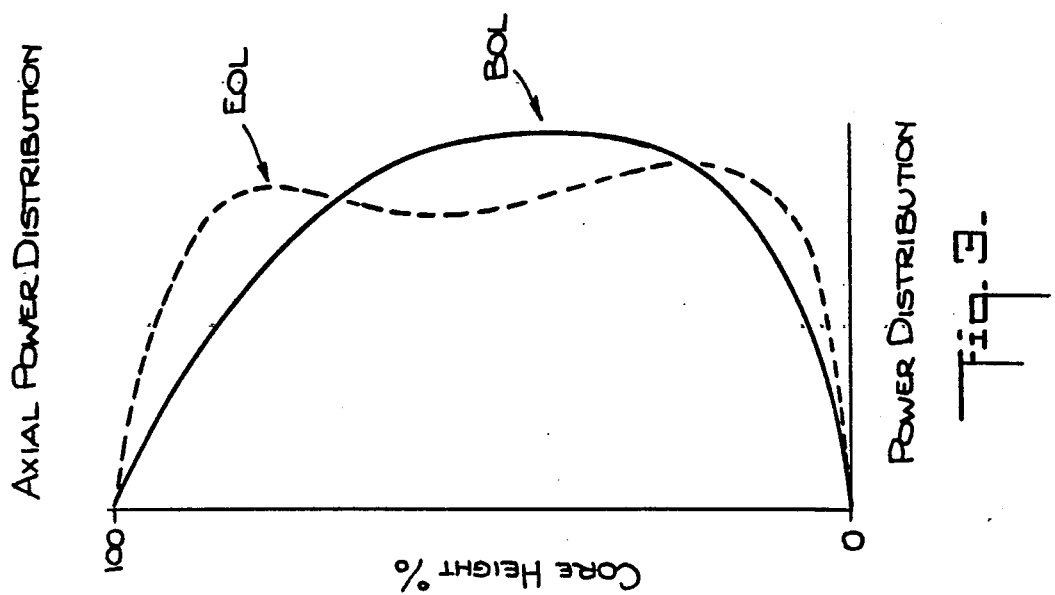
FIG. 3 illustrates the approximate distribution of power along the vertical axis of a reactor at the beginning of cycle lift (BOL) and at the end of cycle life (EOL).

When nuclear reactor control rods are at or near the extremes of their ranges of travel, i.e. fully inserted into the reactor core or fully withdrawn, the exact rod location is not so important as it is when a rod is partially inserted. For this reason, it is reasonable to allow discrepancies greater than 5% or 12 steps between the indicated and demanded control rod locations at such extreme positions. This is shown in FIG. 1 in which actual rod position in steps is shown along the vertical axis and indicated rod position is shown measured in volts along the horizontal axis.

The indicated and actual rod positions coincide along the central straight "target" line. The illustration is somewhat oversimplified, since in reality the target line is not a straight line as shown in FIG. 1, but follows a curve, with corresponding error bands. If the rod position indicator (RPI) system is perfectly calibrated, movement of a rod could be tracked along that target line, each step being matched by a corresponding change in the voltage signal indicated visually to the operator.

During normal reactor operation, the control rods, one of which is designated by reference numeral 10 in FIG. 2 as comprising a cluster of 20 individual rods 11, remain parked near their fully withdrawn condition, about 225 steps withdrawn, out of a possible total of 230 steps or about 144 inches. Shown at 12 in FIG. 2 is a coupling by which the rod 10 is affixed to a drive shaft, the drive shaft serving as a core for the variable transformer which indicates the position of the rod 10 by a voltage signal, which is at its peak when the rod 10 is fully withdrawn. Each upward step produces a corresponding voltage increase. Because of the location of the sensors, a slightly greater error has been considered allowable when the rod is near its fully withdrawn position. Instead of 12 steps, a deviation of 12+5 or 17 steps error in the positive sense has been allowed, while the allowable error in the negative direction remains 12 steps, as the allowable error has been ±12 steps throughout the rest of the range of control rod travel, as shown in FIG. 1 by the two straight lines designated "error (c)" which run parallel to the central "target" line.

Figure 1:
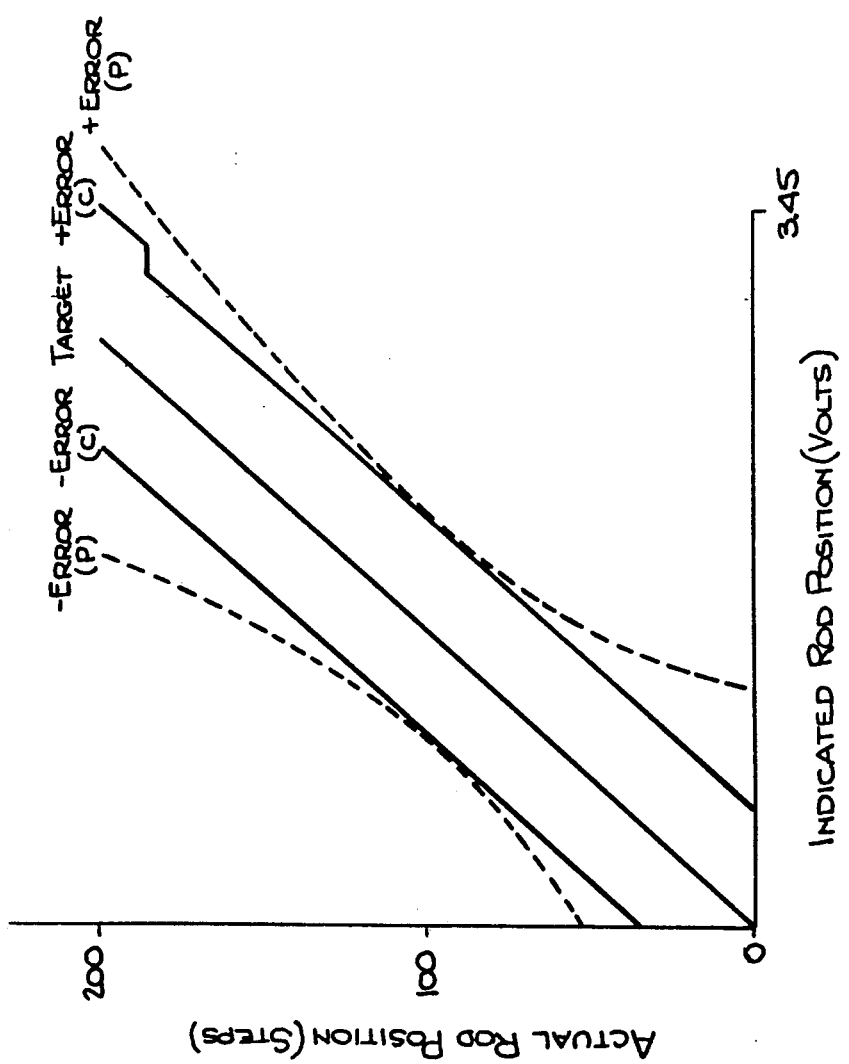
FIG. 1 is a graph illustrating how error bands for discrepancy between actual and indicated control rod position can be increased near the extremes of rod position.

Allowance for the relative importance of exact positioning produces the curves shown in broken lines in FIG. 1 and designated "error (p)". Toleration of the greater apparent error in rod position illustrated by the dashed curves of FIG. 1 will allow more latitude for the practice of the method of the present invention. This is seen to be justified by the illustration of FIG. 3, which shows power distribution along the vertical axial dimension of a reactor core. At the beginning of the reactor cycle life indicated by the curve designated BOL in FIG. 3 it can be seen that power distribution follows a generally cosine shaped curve. Near the end of the cycle life, the curve EOL has a more complex shape, owing to fuel depletion and other factors. In either case, and throughout the intervening cycle, the curve showing axial power distribution falls away toward zero power production at the top and bottom regions of the reactor core.

Since the control rods are normally parked at approximately fully withdrawn positions, where little power is being produced, rod position is not so important as it is when a rod is inserted deeper into the interior of the reactor core.

Figure 4:
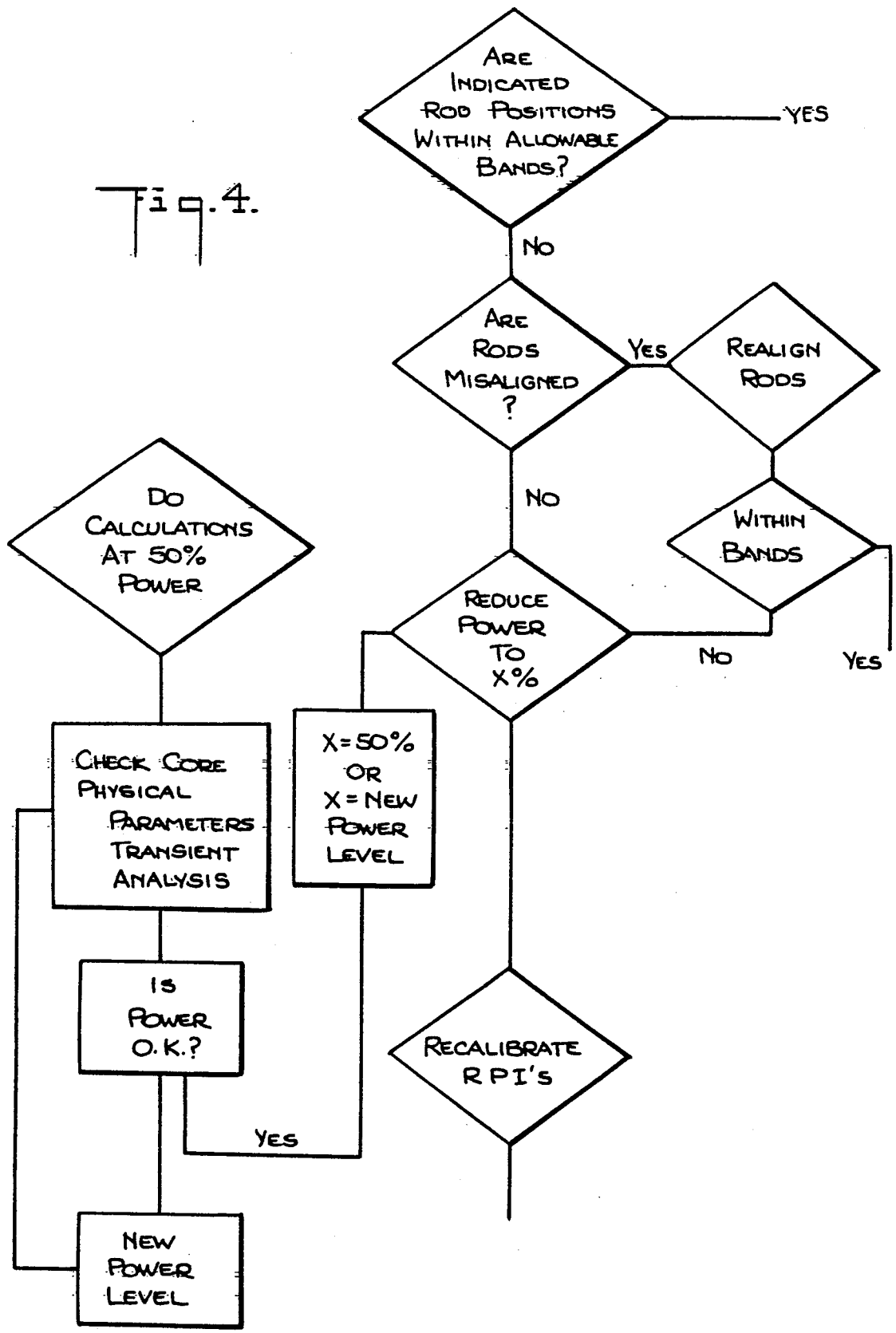
FIG. 4 shows graphically the steps performed in accordance with the method of the invention.

FIG. 4 illustrates the practice of the calibration process of the present invention. When in the course of routine checking of rod positions (usually done for one control rod after another during each reactor operation shift) it is noted that the indicated position of a rod differs from the demanded position by more than the preset allowable error, corrective action must be undertaken.

The first step is to determine whether the control rod (or rods) is, in fact, misaligned. Instrumentation within and outside the reactor core, which need not be described in detail, is used to make this determination. If such instruments as movable detectors within the core show that the misalignment is real, then, of course, the control rod is realigned. If, after taking the usual steps to realign the control rod, the position indicators show it to be aligned within the permissible error band, whether the band width is the conventional 5% or some other amount, no further action is called for.

If however, the control rod was not in fact misaligned, or is still indicated to be misaligned after the realignment steps, the RPI system must be calibrated. In the past, such calibration has required total shutdown of the reactor. Such total shutdown is not always necessary: a partial reduction in power may suffice.

While the other measures referred to above are being taken, the amount of power reduction required for safety can be determined, as shown at the left side of FIG. 4.

A hypothetical power reduction of the nominal amount of 50% can be used to calculate what the physical condition of the reactor core would be if power were reduced 50% and the control rod or rods were inserted into the reactor to the bottom position. This calculation will take into account physical parameters and transient analysis. If it is determined that the calibration procedure according to the method of the invention can properly and safely be done with the reactor operating at 50% power, the reactor power is lowered by 50% by, for example, increasing the boric acid concentration in the coolant. This power reduction having been accomplished, the affected control rod or rods can be fully inserted, and calibration of the RPI system effected in the usual way. That is, after the sensor at the reactor bottom indicates full insertion of the control rod, the rod is withdrawn step by step, and the voltage signal is matched to the step count so that at the fully withdrawn position, and at all intermediate steps, the voltage signal corresponds to the step count.

If calculations at 50% power show that the reactor cannot be properly operated at that power level during the calibration process, the same calculations are repeated for some other new power level. Only when an appropriate and safe power level has been calculated and the reactor power has been reduced accordingly, is calibration undertaken.

After calibration, full power is restored and the reactor is operated normally.

It should be noted that in case several control rods appear to be misaligned, when it has been determined that in fact they are not misaligned, the procedure described can be employed at the same time for more than one control rod, thus keeping the period of reduced power operation shorter than if the RPI's were calibrated one at a time. Rod position indicators which are not beyond, but close to the error band limits, can also be calibrated along with those for which calibration is required.

By avoiding the shutdown of the reactor, the process of the invention results in grate economies in both cost and effort, while continuing to keep the reactor on line and producing power.

Various modifications and adaptations of the method of the invention, which a preferred embodiment has been described, will suggest themselves as obvious to those acquainted with the art, and as such, are considered to be within the spirit and scope of the present invention. For example, calibration according to the method described can be carried out periodically even though no RPI shows that a rod is misaligned.

What is claimed is:

1. A procedure for calibration of a rod position indicator in a nuclear reactor having movable control rods without total shutdown of the reactor, comprising: noting that the indicated position of a rod differs from a demand position of the rod by an extent exceeding a predetermined error range, determining that the rod is actually within the predetermined error range; calculating an amount of power reduction at which said rod can be properly and safely fully inserted for the purpose of calibration of the rod position indicator; reducing power by the calculated amount, and; fully inserting the rod and calibrating the rod position indicator while withdrawing the rod.

2. The procedure of claim 1 wherein the predetermined error range is greater at extremes of control rod position than when the control rod is at an intermediate position.

3. The procedure of claim 1 wherein the rod position indicator provides a visual display of rod position, and an operator periodically logs said visual display.

4. A method for calibrating a rod position indicator in a nuclear reactor of the type having movable control rods, and wherein the rod position indicator comprises a variable transformer for indicating control rod position as a voltage signal and the control rods are vertically movable in equally spaced steps, comprising: upon indication by the rod position indicator that a control rod is at a vertical position which deviates by more than a predetermined extend from a demand position for said control rod and determining that the control rod does not in fact deviate from its demand position by more than said predetermined extend, calculating a reduced reactor power at which reduced power said control rod can be fully inserted into a core of the reactor without violation of prescribed operational specifications, reducing the reactor power to the calculated reduced power, and fully inserting the control rod and then withdrawing the rod while calibrating the rod position indicator.

5. The method of claim 4 wherein the voltage signal is essentially directly proportional to the vertical position of the control rod with respect to the reactor core.

6. The method of claim 4 wherein rod position indicators of more than one control rod are calibrated simultaneously.

7. The method of claim 4 wherein the reactor power is reduced by increasing the amount of soluble absorber in the reactor core.

* * * * *